(12) United States Patent
Loffink et al.

(10) Patent No.: US 8,667,309 B2
(45) Date of Patent: Mar. 4, 2014

(54) METHODS AND SYSTEMS FOR POWER SUPPLY MANAGEMENT

(71) Applicants: John Loffink, Austin, TX (US); George Richards, III, Round Rock, TX (US); Elie Jreij, Pflugerville, TX (US)

(72) Inventors: John Loffink, Austin, TX (US); George Richards, III, Round Rock, TX (US); Elie Jreij, Pflugerville, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 13/720,034

(22) Filed: Dec. 19, 2012

(65) Prior Publication Data

US 2013/0111232 A1    May 2, 2013

Related U.S. Application Data

(62) Division of application No. 12/571,652, filed on Oct. 1, 2009, now Pat. No. 8,341,448.

(51) Int. Cl.
    *G06F 1/26* (2006.01)
(52) U.S. Cl.
    USPC .......................................... 713/300; 310/340

(58) Field of Classification Search
    None
    See application file for complete search history.

(56) References Cited

U.S. PATENT DOCUMENTS

| 6,209,064 | B1 | 3/2001 | Weber |
| 6,949,916 | B2 | 9/2005 | Chapuis |
| 7,249,267 | B2 | 7/2007 | Chapuis |
| 2002/0152407 | A1 | 10/2002 | Alia et al. |
| 2004/0246754 | A1* | 12/2004 | Chapuis ........................... 363/89 |
| 2007/0240019 | A1 | 10/2007 | Brady et al. |
| 2009/0199021 | A1 | 8/2009 | Chu et al. |
| 2010/0057944 | A1* | 3/2010 | Eberhard ......................... 710/10 |
| 2010/0115302 | A1* | 5/2010 | Cho et al. ....................... 713/310 |

* cited by examiner

*Primary Examiner* — Paul Yanchus, III
(74) *Attorney, Agent, or Firm* — Baker Botts L.L.P.

(57) ABSTRACT

System and methods for controlling power delivery to system components are disclosed. A controller is communicatively coupled to a point-of-load converter through a first communication path and a shared memory is communicatively coupled to the point-of-load converter through a second communication path. A third communication path communicatively couples the controller and the shared memory. Control data is communicated from the controller to the point-of-load converter through the first communication path and measurement data is written from the point-of-load converter to the shared memory through the second communication path. The controller is operable to read the measurement data from the shared memory through the third communication path.

3 Claims, 4 Drawing Sheets

METHODS AND SYSTEMS FOR POWER SUPPLY MANAGEMENT

CROSS-REFERENCE TO RELATED APPLICATION

The present application claims priority to and is a divisional application of U.S. patent application Ser. No. 12/571,652, filed Oct. 1, 2009, entitled "Method and Systems for Power Supply Management", which is incorporated by reference herein in its entirety.

TECHNICAL FIELD

The present disclosure relates generally to power system architectures, and, more particularly, to a system and method for controlling and monitoring Point-of-Load converters ("POL converters") in an information handling system.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

An information handling system will typically include a power supply mechanism. The different components of an information handling system often operate at different designated current and voltage levels. Moreover, discrete circuits within the information handling system may operate at a relatively low voltage and a relatively high current. In order to meet the various power supply requirements within the information handling system, minimize unwanted power dissipation and accommodate changes in load requirements, POL converters may be placed at discrete points of power consumption within the information handling system. Specifically, each discrete circuit within the information handling system may be associated with a POL converter which may convert an intermediate bus voltage to the voltage and current level required by that circuit.

Typically, a power supply controller performs as a central unit for monitoring and controlling the operation of the individual POL converters in the system to ensure optimal performance. For instance, the power supply controller may enable or disable a POL converter and set the desired output voltage of a POL converter. Additionally, the power supply controller may monitor the output voltage of a POL converter and connect the output voltage of the POL converter to its associated circuit only if the output voltage meets certain preset criteria such as voltage level and slew rate. However, existing power supply mechanisms are expensive and complex.

SUMMARY

In one exemplary embodiment, a power supply management system is disclosed. The power supply management system includes a controller communicatively coupled to a point-of-load converter through a first communication path and a shared memory communicatively coupled to the point-of-load converter through a second communication path. A third communication path communicatively couples the controller and the shared memory. Control data is communicated from the controller to the point-of-load converter through the first communication path and measurement data is written from the point-of-load converter to the shared memory through the second communication path. The controller is operable to read the measurement data from the shared memory through the third communication path.

In another exemplary embodiment, a method of optimizing power consumption is disclosed. The method includes monitoring a system memory using a memory controller and evacuating unnecessary memory space if a lower memory capacity would be sufficient for current operating environment. A first signal is then transmitted from the memory controller to a controller to inform the controller of memory evacuation. Next, a second signal is transmitted from the controller to a point-of-load converter associated with the system memory to inform the point-of-load converter of reduced power requirement of the system memory. The amount of power delivered from the point-of-load converter to the system memory is then reduced based on the second signal. A third signal is transmitted from the point-of-load converter to the controller to inform the controller of reduction in power delivered from the point-of-load converter to the system memory and a fourth signal is transmitted from the controller to a power supply associated with the point-of-load converter to inform the power supply of reduced power requirement. The amount of power delivered from the power supply to the point-of-load converter is then reduced based on the fourth signal. Finally, a fifth signal is transmitted from the power supply to the controller to inform the controller of reduction in power delivered from the power supply.

In another exemplary embodiment, a power management system is disclosed which includes a controller and a power management controller communicatively coupled to the controller through a serial bus. A point-of-load converter is communicatively coupled to the power management controller through a parallel bus and a multiplexed analog bus. The parallel bus transmits control data from the power management controller to the point-of-load converter and the multiplexed analog bus transmits measurement data from the point-of-load converter to the power management controller.

Thus, the present disclosure provides apparatuses and methods for efficient and robust control of power delivery to system components. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1:
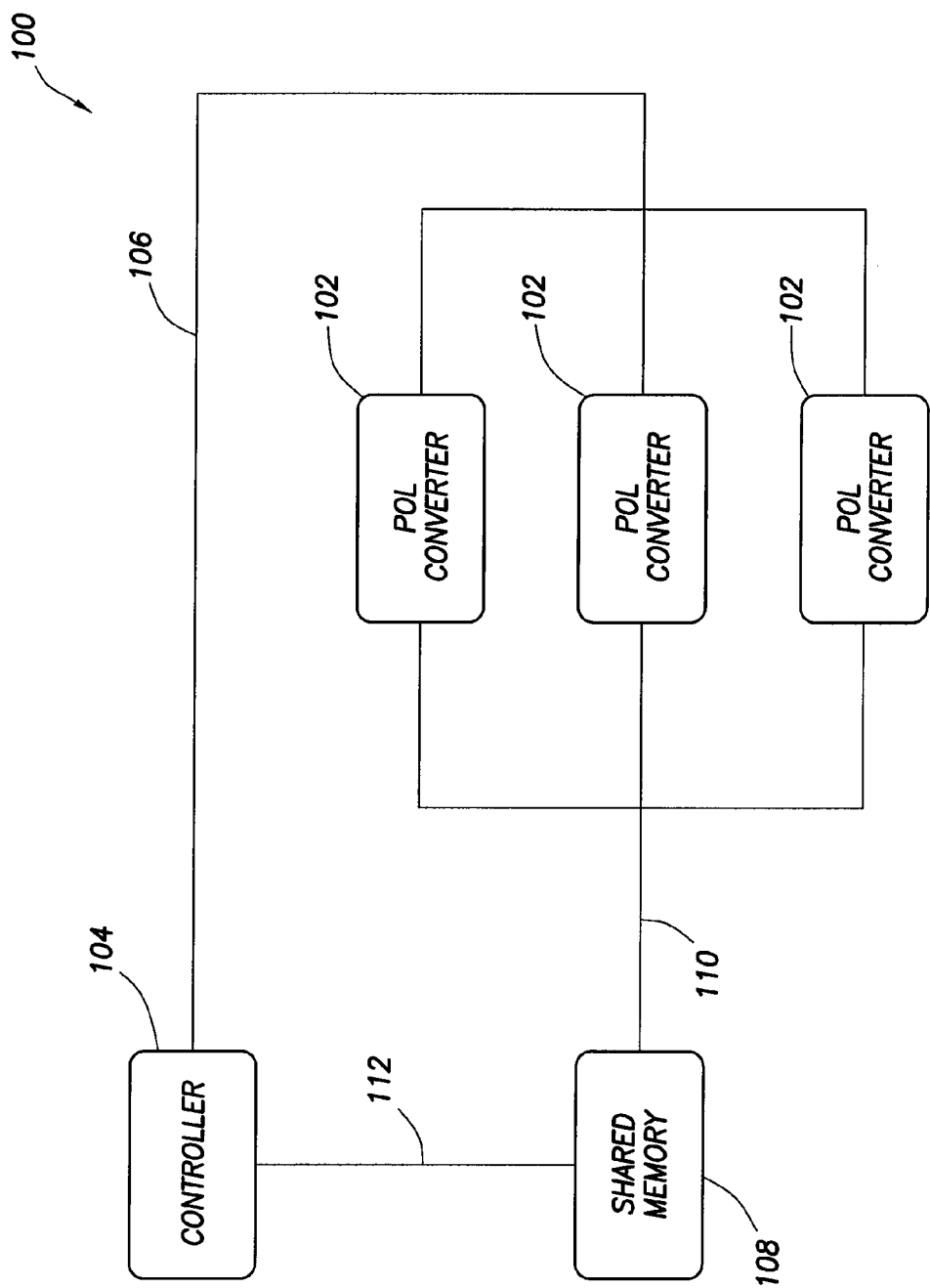
FIG. 1 is a block diagram of a power management system in accordance with a first exemplary embodiment of the present invention.

Shown in FIG. 1 is a block diagram of a power management system in accordance with an exemplary embodiment of the present invention which is denoted generally by reference numeral 100. The power management system 100 may include one or more POL converters 102. The POL converters 102 may control power delivery to discrete circuit components (not shown). A controller 104 such as a Baseboard Management Controller ("BMC") is communicatively coupled to the POL converters 102 through a first communication path 106. As would be appreciated by those of ordinary skill in the art, with the benefit of this disclosure, the first communication path 106 may be a Power Management Bus ("PMBus"). The POL converters 102 are also communicatively coupled to a shared memory 108 through a second communication path 110. As would be appreciated by those of ordinary skill in the art, with the benefit of this disclosure, the shared memory 108 may have a number of different configurations. For instance, the shared memory 108 may be Random-Access Memory ("RAM"), Flash Memory or Electrically Erasable Programmable Read-Only Memory ("EEPROM") depending on the system preferences. Depending on the type of memory used in the shared memory 108, the second communication path 110 may be a serial or a parallel memory interface. The controller 104 is communicatively coupled with the shared memory 108 through a third communication path 112 which may be a serial or a parallel memory interface. In this embodiment, the controller 104 sends control commands to the POL converters 102 through the first communication path 106. The control commands from the controller 104 to the POL converters 102 may include an enable/disable bit for turning each POL converter 102 on and off, and Voltage Identification (VID) code bits for regulating the voltage output of the POL converters 102.

In this embodiment, the measurement data from the POL converters 102 are written to the shared memory 108 through the second communication path 110. The measurement data may include information about the output of the POL converters 102 such as the output current/voltage which can be used to monitor and detect a failure of the POL converters 102. The controller 104 may then read the measurement data from the shared memory 108 through the third communication path 112. Similarly, timing data is written by the controller 104 to the shared memory 108 through the third communication path 112. The timing data may include the timing parameters for the output of the POL converters 102 such as sequencing, slew rate, etc. The POL converters 102 may then retrieve the timing data from the shared memory area 108 through the second communication path 110. As would be appreciated by those of ordinary skill in the art, with the benefit of this disclosure, although each communication path is depicted as a single line, each communication path may be a serial or parallel communication path.

Figure 2:
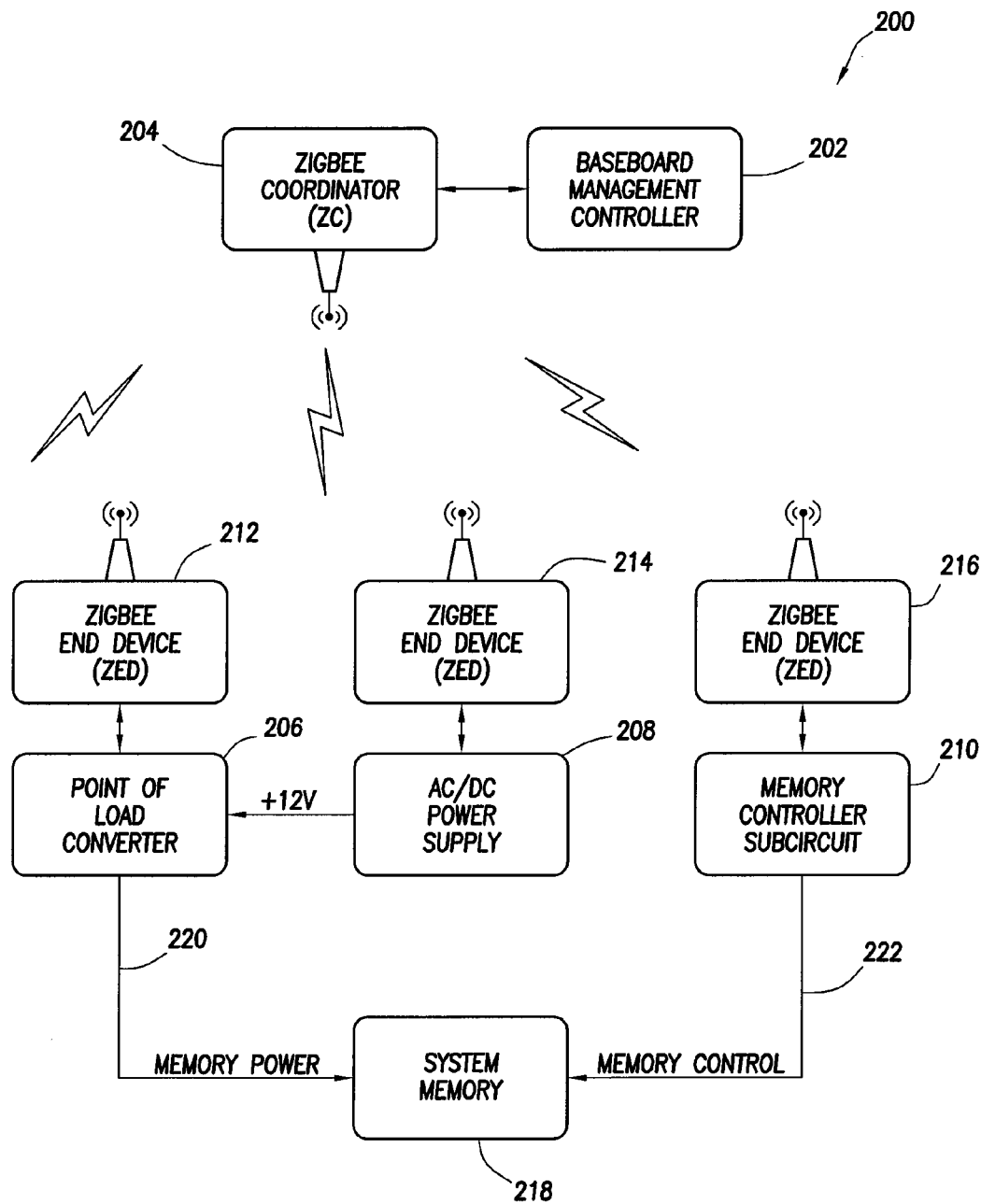
FIG. 2 is a block diagram of a power management system in accordance with a second exemplary embodiment of the present invention.

FIG. 2 is a power management system in accordance with a second exemplary embodiment of the present invention, denoted generally by reference numeral 200. In this embodiment, the different components of the power management system 200 are communicatively coupled through a wireless interface. As would be appreciated by those of ordinary skill in the art, with the benefit of this disclosure, the wireless connection may be implemented using any appropriate wireless protocol such as Bluetooth technology or Zigbee technology. In one exemplary embodiment, Zigbee technology may be used to implement the wireless connection. In this embodiment, a controller 202 such as a BMC is communicatively coupled to a Zigbee Coordinator (ZC) 204. Similarly, the system may include one or more POL converters 206, a power supply 208 and a memory controller 210, each communicatively coupled to a Zigbee End Device (ZED) 212, 214 and 216 respectively. The POL converter 206 may control power delivery to discrete circuit components. For instance, as depicted in FIG. 2, the POL converter 206 may supply power to the system memory 218 through the connection 220. A memory controller 210 may be communicatively coupled to the system memory 218 through a communication path 222. Once the system is turned on, the ZC 204 will communicate with the ZEDs 212, 214 and 216 and the controller 202 will recognize the different components in the system.

The controller 202 may then manage the system through the wireless interface. In one embodiment, the controller 202 may send control signals or timing parameters to the POL converter 206 whereby the control signals or timing parameters are communicated from the ZC 204 associated with the controller to the ZED 212 associated with the POL converter 206. The control signals may include enable/disable signals to turn the POL converter 206 on and off and Voltage Identification (VID) code bits for regulating the voltage output of the POL converter 206. The timing parameters may include slew parameters, frequency parameters, and phase parameters. Similarly, control signals may be transmitted from the ZC 204 to the other components of the power management system 200. These control signals may include, but are not limited to signals which may control number and data formats, accuracy and resolution, protocol definitions and capabilities, network parameters, error checking, addressing, grouping, interrupt sources, firmware updates, power optimization, measurement parameters, timing, calibration and tuning, device ratings, configuration, warning and limit parameters, input and output sources, current sharing, fan/cooling control, thermal envelope, fault and margin management and projected operating conditions.

Similarly, the wireless interface may be used by the controller 202 to obtain measurement data from the POL converter 206 and other components of the power management system 200 through their respective ZEDs. The measurement data may include, but is not limited to power/current/voltage measurements, actual measured or derived operating conditions such as power factor and efficiency, fault and warning status, location, fan status, temperatures, airflow, predictive failures.

As would be appreciated by those of ordinary skill in the art, with the benefit of this disclosure, the utilization of the wireless interface enables the controller 202 to monitor the different components of the power management system 200 and adjust the system requirements to optimize the overall system performance.

Figure 3:
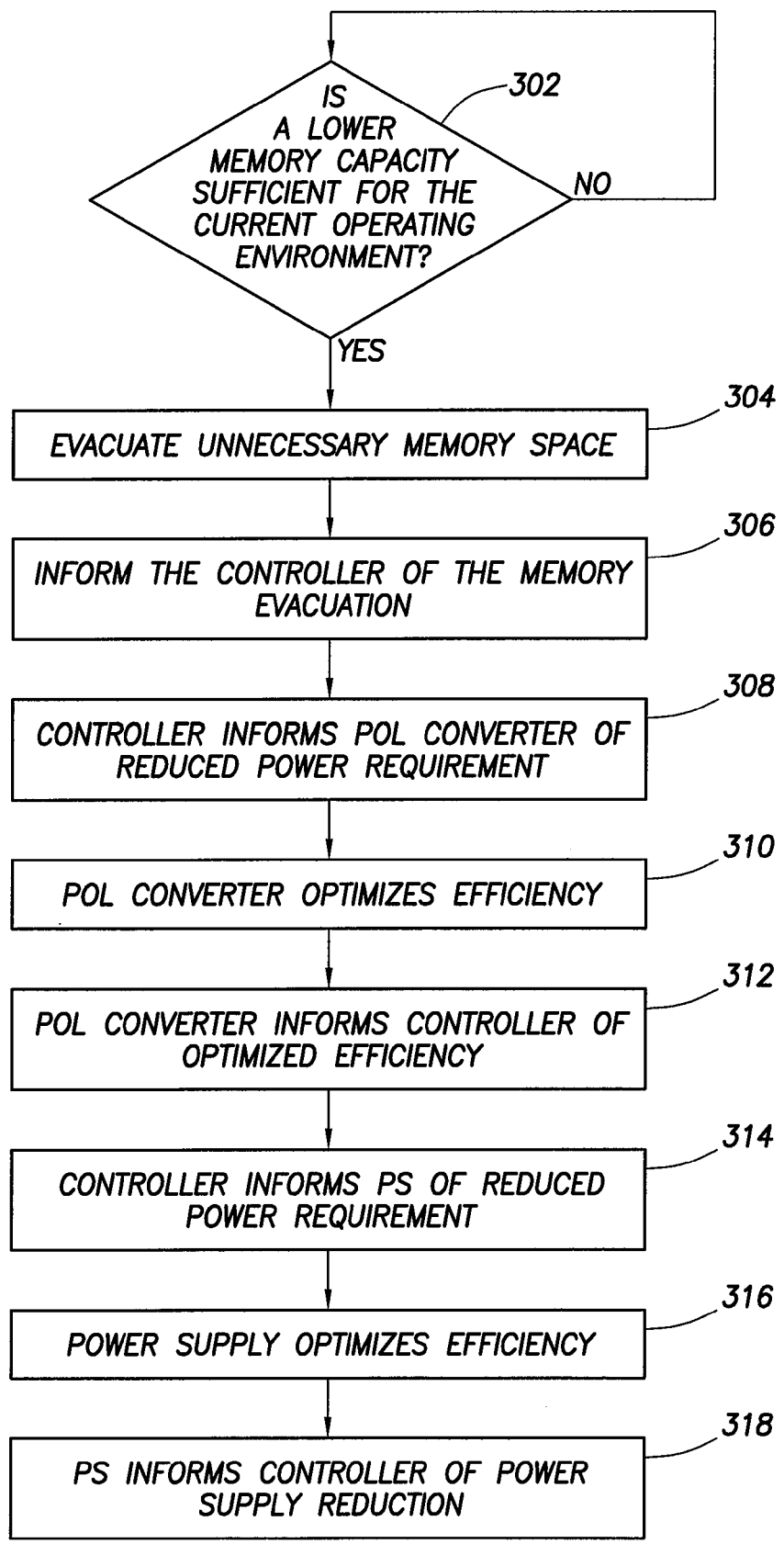
FIG. 3 is a flow diagram of exemplary steps that may be taken by a power management system in accordance with the second exemplary embodiment of the present invention to optimize system performance.

Turning now to FIG. 3, a flow diagram of the steps taken by the power management system 200 to optimize system performance based on memory usage are depicted. First, at 302, the memory controller 210 checks to find out whether a lower memory capacity is sufficient for the current operating environment. As would be appreciated by those of ordinary skill in the art, with the benefit of this disclosure, this decision may be made by the Operating System or a Hypervisor. If a lower memory capacity is not sufficient for the current operating environment, the memory controller 210 will continue to check by returning to step 302. If it is determined that a lower memory capacity is sufficient for the current operating environment, then, at 304, the memory controller 210 evacuates the unnecessary memory space from the system memory 218. At 306, the memory controller 210 informs the controller 202 of the memory evacuation. This information is communicated from the memory controller 210 to its associated ZED 216 which then transmits that information to the ZC 204. The controller 202 receives this information from ZC 204. At 308, the controller 202 transmits a signal to the POL converter 206 through the ZC 204 and the ZED 212 informing the POL converter 206 that the required operating power of the system memory 218 has been reduced. Based on the information received from the controller 202, at 310 the POL converter 206 takes the necessary actions to reduce the power delivered to the system memory 218 and optimize efficiency. As would be appreciated by those of ordinary skill in the art, with the benefit of this disclosure, such steps may include, but are not limited to, phase shedding, changing the frequency of Pulse-Width Modulation, or a combination thereof.

Once the POL converter 206 has reduced power delivery, at step 312 it sends a signal to the controller 202 through the ZED 212 and ZC 204 informing the controller 202 of the reduction in power requirements of the system. Once the controller 202 receives this information from the POL converter 206, at 314, the controller 202 transmits a signal to the power supply 208 through the ZC 204 and the ZED 214 informing the power supply 208 that the operating power is reduced. Once this signal is received by the power supply 208, at 316, the power supply 208 takes the necessary steps to optimize efficiency. As would be appreciated by those of ordinary skill in the art, with the benefit of this disclosure, such steps may include, but are not limited to phase shedding, changing the frequency of Pulse-Width Modulation, or a combination thereof. Finally, at 318, the power supply 208 transmits a signal to the controller 202 through the ZED 214 and the ZC 204 informing the controller that the power supply to the system has been reduced and the optimization is completed at step 320.

As would be appreciated by those of ordinary skill in the art, with the benefit of this disclosure, the systems and methods described herein may be utilized in AC-AC, AC-DC, DC-DC or DC-AC conversions.

Figure 4:
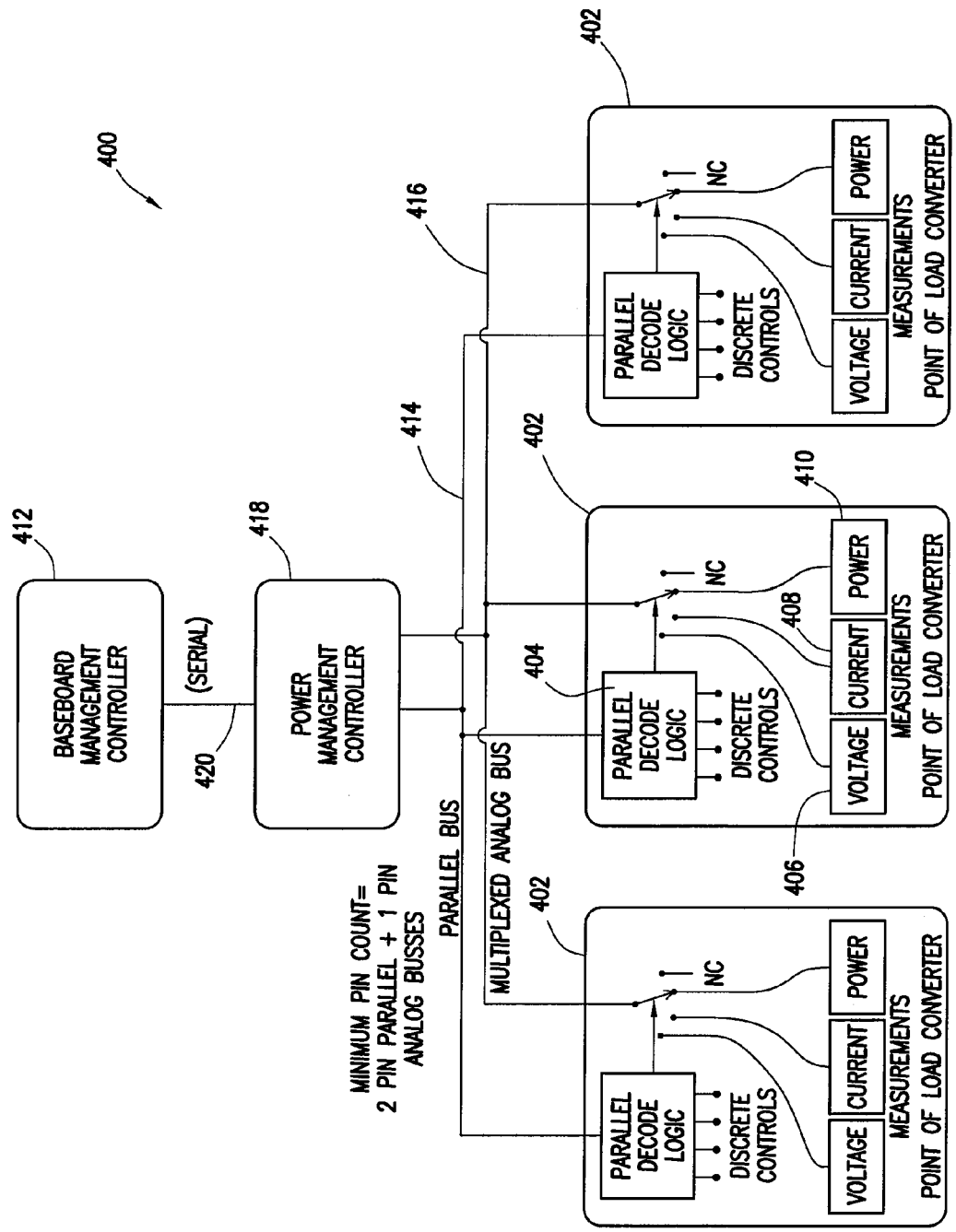
FIG. 4 is a block diagram of a power management system in accordance with a third exemplary embodiment of the present invention.

Shown in FIG. 4 is a block diagram of a power management system in accordance with another exemplary embodiment of the present invention, denoted generally by reference numeral 400. The power management system 400 may include one or more POL converters 402. The POL converters 402 may control power delivery to discrete circuit components (not shown) within the system. In an exemplary embodiment, the POL converters 402 may include parallel decoder logic 404 and be operable to monitor their own output characteristics such as voltage 406, current 408 and power 410.

A controller 412 manages the operations of the POL converters 402. In one exemplary embodiment, the controller 412 may be a BMC. In this exemplary embodiment, traditional parallel and analog transmissions are utilized to transfer data for power buses. All control data is transmitted from the controller 412 to the POL converters 402 on a parallel bus 414. The control data may include enable/disable signals to turn the POL converter 402 on and off and Voltage Identification (VID) code bits for regulating the voltage output of the POL converter 402. Typical parallel buses are defined in terms of 4 bits or multiples of 8 bits. However, as would be appreciated by those of ordinary skill in the art, with the benefit of this disclosure, a lower pin count could be achieved using a 2 bit parallel bus with embedded clocking, equal in pin count to a two wire serial bus with a separate clock. As would be appreciated by those of ordinary skill in the art, with the benefit of this disclosure, since no standard exists for a low pin count parallel bus, the interface between the controller 412 and the POL converters 402 may have to be "bit-banged" through discrete controller IO. Consequently, in one exemplary embodiment, the controller 412 may be aggregated to a Power Management Controller 418 through a serial bus 420. The Power Management Controller 418 operates to reduce the requirements on the controller 412 by offloading the communication with the POL converters 402 and collecting data. The Power Management Controller 418 can also do some pre-processing and checking for certain events or thresholds so that only relevant data is sent to the controller 412. In this embodiment, the information is transmitted between the POL converters 402 and the controller 412 through the Power Management Controller 418.

A shared multiplexed analog bus 416 communicates measurement data from the POL converters 402 to the controller 412. The data on the parallel bus from the controller 412 may also control source level multiplexing of analog measurement signals or other analog data to the shared analog bus 416. Specifically, the POL converters 402 may include a parallel decode logic 404 which may decode the information received through the parallel bus 414 from the controller 412 and control the transmission of measurement data such as the voltage 406, current 408 and power 410 from the POL converters 402 to the controller 412 through the multiplexed analog bus 416.

Although the present disclosure has been described in detail, it should be understood that various changes, substitutions, and alterations can be made hereto without departing from the spirit and the scope of the invention as defined by the appended claims.

What is claimed is:

1. A wireless power supply management mechanism comprising:
   a controller communicatively coupled to a first wireless communication device;
   a power supply communicatively coupled to a second wireless communication device; and
   a point-of-load converter communicatively coupled to a third wireless communication device;
   one or more timing signals, wherein the one or more timing signals are sent by the controller to the point-of-load converter;
   wherein the controller communicates with the power supply using the first wireless communication device and the second wireless communication device; and
   wherein the controller communicates with the point-of-load converter using the first wireless communication device and the third wireless communication device.

2. The system of claim 1, further comprising:
   a memory controller communicatively coupled to a system memory and a fourth wireless communication device;
   wherein the memory controller controls operations of the system memory;
   wherein the point-of-load converter supplies power to the system memory; and
   wherein the controller communicates with the memory controller using the first wireless communication device and the fourth wireless communication device.

3. The system of claim 1, wherein the first wireless communication device comprises a Zigbee Coordinator and the second wireless communication device and the third wireless communication device comprise a Zigbee End Device.

* * * * *